Patented Apr. 25, 1933

1,905,900

UNITED STATES PATENT OFFICE

PAUL JOHNSON CARLISLE AND RALEIGH P. WARD, OF NIAGARA FALLS, NEW YORK, ASSIGNORS TO THE ROESSLER & HASSLACHER CHEMICAL COMPANY, OF NEW YORK, N. Y., A CORPORATION OF DELAWARE

PROCESS FOR VAPOR RECOVERY

No Drawing.   Application filed April 21, 1931. Serial No. 531,847.

This invention relates to the art of treating materials with volatile solvents and more particularly to a process for recovering solvent vapors evaporated from the treated materials.

In a number of processes where volatile solvents are employed, certain halogenated hydrocarbon solvents are superior in several respects to the solvents commonly used. But the higher cost of the halogenated hydrocarbons makes their use prohibitive unless the process is operated without substantial loss of solvent. One cause of loss in such processes is the difficulty of completely recovering solvent vapors when they become mixed with non-condensable gases. For instance, in washing textile fabrics and the like with volatile solvent, a mixture of solvent vapor and air is produced during the evaporation of adhering solvent from the washed material. It has been proposed to recover solvent from the mixture by condensation, but this recovery is usually incomplete since it is not practical to cool to the point where the vapor pressure of the solvent is inappreciable.

The recovery of vapors by adsorbent materials has been practiced to some extent. The absorbent acts as a reservoir in which the vapors are concentrated and later removed. Dehydrated alumina gel is sometimes used for such purposes. But, alumina gel has heretofore not been used, or even considered applicable, for adsorbing halogenated hydrocarbons because of the decomposing action of the alumina gel.

One object of this invention is to provide an effective means of recovering substantially acid free halogenated hydrocarbon solvent vapors from their mixture with a non-condensable gas. A further object is the adaptation of dehydrated alumina gel as an adsorbent in such manner that the recovered solvent is substantially uncontaminated by acid and the adsorptive power of the alumina gel is substantially undiminished during continued use. A still further object is to adapt such recovery to a circulatory or other system wherein such solvent is used and wherein the above-mentioned vapor-gas mixtures are formed. Other objects will be hereinafter apparent.

We have now found that, although there is some decomposition of halogenated hydrocarbon solvents on contact with alumina, such decomposition is small, can be minimized and is not detrimental. Moreover, that although some acids accumulate in the alumina we have found that the amount accumulated apparently reaches an equilibrium and surprisingly the alumina may be continually used without loss of adsorptive power in spite of its acid content. We have also found that the acid formed can be prevented from contaminating the solvent recovered from the alumina.

The method comprises contacting a mixture containing halogenated hydrocarbon vapor with dehydrated alumina gel at comparatively low temperatures to accumulate the halogenated hydrocarbon; removing the halogenated hydrocarbon from the gel with a carrying gas at relatively higher temperatures so as to form a rich gas-vapor mixture, cooling this enriched mixture and separating the liquid halogenated hydrocarbon from the carrying gas and acid constituents. We have discovered that the acid constituents formed by decomposition of the halogenated hydrocarbons are substantially eliminated with the uncondensed carrying gas. The alumina gel may be used an indefinite number of times in this cycle with substantially no diminution of its adsorptive power.

One method of carrying out our invention will now be described with reference to washing of textile fabrics and the like with trichlorethylene. After the fabrics have been washed and most of the liquid solvent has been removed therefrom by a suitable operation such as centrifuging, they are placed in a "dryer" where the remainder of the adhering solvent is removed by a current of hot air.

The off-gases from the dryer are passed through a condenser where part of the trichlorethylene is removed as liquid. The condenser off-gases, which may contain around 3% by volume of solvent vapors, are then contacted with dehydrated alumina gel. A suitable method comprises passing the gases through a mass of small particles of gel. We prefer to arrange a plurality of such masses in such fashion that the gases may be passed through one or more while solvent is being removed from the others.

We prefer to maintain the temperature of the gas entering the alumina gel at about 10–30° C. Some heat is generated within the gel and this may be reduced if desired by suitable cooling arrangement, but such cooling is not always necessary. We have carried out satisfactory adsorption operations in which the temperature in the gel rose as high as 30–40° C. When the gel becomes saturated with solvent, or preferably before saturation, the entering gas-vapor mixture may be diverted to a fresh body of gel. For determining this point the gel may be considered saturated when appreciable amounts of solvent vapor appear in the off-gas.

The adsorbed solvent is recovered from the gel by contacting the latter with a gas at an elevated temperature, that is at a temperature higher than that occurring in the gel during adsorption. For this purpose we prefer to use air at about 90–150° C. The gel may be heated while air is contacted therewith or the air may be heated before contacting with the gel. The hot off-gases thus enriched with solvent are cooled by a suitable means, for instance a water-cooled tubular condenser, to recover liquid solvent. A large proportion of the solvent in the enriched off-gas may be condensed and the condensate is substantially acid-free. The residual uncondensed gas contains a small amount of trichlorethylene vapor and acid vapors. We prefer to remove the acid by scrubbing the gas with alkali and then to contact the acid-free gas with unsaturated alumina gel to remove the residual trichlorethylene. If desired, the acid-free gas may be reheated and recycled to evaporate more trichlorethylene.

After a mass of alumina gel has been treated with hot gas to remove trichlorethylene, it may be used again to adsorb more of the solvent. It may be used repeatedly, being contacted alternately with solvent-gas mixture at a low temperature and gas at a higher temperature, without substantial diminution of adsorptive power. An appreciable proportion of the acid substance formed by decomposition of the adsorbed solvent remains in the gel when the solvent is removed by hot gas treatment. However, this acid does not materially affect the power of the gel to adsorb halogenated hydrocarbon.

Another method of removing adsorbed solvent from the alumina gel consists in treating the gel with steam, preferably at about 100° C. This method not only is efficient in removing the solvent but also removes most if not all, of any acid which has accumulated in the alumina. When the out-going vapors from the steam treatment are condensed, substantially all of the acid remains in the water and the separated liquid solvent is substantially acid-free. Before reusing as adsorbent, steam treated gel is preferably treated to remove adsorbed water. This is preferably done by treating it with air at about 150° C.

Dehydrated alumina gel may be used without the ordinary revivification in the above described processes with no material loss in its adsorptive power. The recovered liquid halogenated hydrocarbon does not contain more than a trace of whatever acid substances are formed; and the loss due to decomposition is so small as to be of little importance from a practical standpoint.

*Example*

A mixture of trichlorethylene vapor and air was produced by passing air through cold, liquid, acid-free trichlorethylene. This vapor-air mixture was then passed through a tube packed with small pieces of dehydrated alumina gel, for a length of time (determined by preliminary experiments) sufficient to insure complete saturation of the gel with trichlorethylene. During this process, the temperature within the body of gel was measured frequently. The tube containing the gel was weighed before and after the passage of the gases, to determine the amount of trichlorethylene adsorbed. The tube was then heated by immersion in an oil bath held at about 90° C. and air at 20–30° C. was passed through until substantially all the adsorbed trichlorethylene was removed. The vapor-air mixture leaving the gel was passed through a condenser to recover liquid trichlorethylene; and the off-gases from the condenser were passed to apparatus for determining the acid-content by neutralization with an alkaline solution of known strength and volume. The acidity of the recovered liquid trichlorethylene was measured by titration with a standard alkaline solution. In the results below, this acidity is expressed in terms of the number of cubic centimeters of 0.01 normal alkali required to neutralize 25 cubic centimeters of the trichlorethylene.

The above process was repeated eight times, using the same alumina gel each time, with no intermediate treatment of any sort.

After the eighth run, steam at about 100° C. was passed through the gel and then condensed. The aqueous condensate was titrated with alkali to determine what amount of acid was removed from the gel.

The results obtained for the eight runs are given in the following table:

| Run | Amount of Trichlorethylene adsorbed (grams) | Acidity of condensed trichlorethylene | Vol. of 0.01N alkali neutralized by condenser off-gas (c. c.) | Maximum temperature of gel during adsorption (°C) |
|---|---|---|---|---|
| 1 | 25.54 | 0.7 | 9.1 | 39.4 |
| 2 | 25.04 | 0.4 | 18.2 | 41.1 |
| 3 | 26.96 | 0.6 | 18.4 | 42.0 |
| 4 | 24.72 | 0.4 | 18.0 | 43.2 |
| 5 | 29.89 | 0.3 | 16.3 | 45.2 |
| 6 | 27.23 | 0.3 | 15.1 | 43.0 |
| 7 | 28.85 | 0.8 | 15.0 | 44.7 |
| 8 | 26.58 | 0.4 | 13.7 | 46.3 |
| Totals | 214.81 | | 123.8 | |

Volume of 0.01N alkali required to neutralize the acid removed from the gel by steam_____ 172.0 cc.
0.01N alkali equivalent of total acid formed_____ 295.8 cc.

These results show that there was no diminution of the adsorptive power of the gel when it was used over and over and the acidity of the recovered solvent was so slight as to be negligible for all practical purposes. Furthermore, the amount of solvent decomposed, as indicated from the total acid formed, was very small, probably less than 1%.

Our invention may be operated either intermittently or continuously by making suitable modifications apparent to one skilled in such operations. In addition to recovery of solvent vapor from a dryer, our invention may be applied to recover halogenated hydrocarbon solvent from any mixture of its vapor with non-condensable gases, regardless of the source of such mixture. It may be applied, for instance, to the treatment of vent gases from storage tanks or other solvent containers. It is applicable to metal degreasing, extraction, spray painting, and other processes using volatile solvents, as well as to washing or dry cleaning processes. It may be used to recover mixtures of solvents as well as a single solvent.

Any gases which do not react with the chlorinated hydrocarbon, the alumina or other materials connected with the process are suitable for carrying the chlorinated hydrocarbon vapors although as indicated above, we prefer to use steam or air. Such gases will hereafter be designated "inert".

In the specification and claims we use the term "dehydrated alumina gel" to mean any form of aluminum oxide or aluminum hydroxide which may be either completely or partially dehydrated and which has adsorptive power for halogenated hydrocarbons, whether or not it is admixed with other substances.

I claim:

1. Process for removing trichlorethylene vapors from an admixture with an inert gas comprising adsorbing said trichlorethylene in alumina gel.

2. Method of concentrating mixtures of trichlorethylene with inert gas comprising adsorbing said trichlorethylene from the gas mixture with alumina gel at relatively low temperatures and then treating said alumina gel with inert gas at a relatively elevated temperature to form an enriched mixture of said trichlorethylene and inert gas.

3. A process for recovering trichlorethylene solvent from a mixture of its vapor with air comprising contacting said mixture with dehydrated alumina gel, subsequently contacting said gel with hot gas and condensing the resulting solvent vapors from the mixture.

4. A process for recovering trichlorethylene from a mixture of its vapor with air comprising contacting said mixture with dehydrated alumina gel at 10–40° C, subsequently contacting said gel with air at 90–150° C. to substantially completely remove trichlorethylene and restore said gel to its original state of activity and cooling the off-gases to condensation of the trichlorethylene.

5. Process for recovering trichlorethylene vapors from admixture with larger proportions of inert gases comprising adsorbing the vapors by contacting the mixture with alumina gel at comparatively low temperatures, removing the vapors from the gel by contacting substantially fresh inert gas therewith at relatively elevated temperatures, and cooling the resulting gas mixture to liquefaction of the trichlorethylene.

6. Process for recovering trichlorethylene vapors from admixture with larger proportions of inert gases comprising adsorbing the vapors by contact with dehydrated alumina gel at comparatively low temperatures, removing said vapors from the gel by contacting fresh inert gas therewith at elevated temperatures, cooling the resulting gas mixture to liquefaction of the trichlorethylene, purging the off-gases from acids and thereafter reusing the inert gas and gel for further recovery.

7. A process for recovering trichlorethylene solvent from a mixture of its vapor with air comprising contacting said mixture with dehydrated alumina gel, recovering solvent from said gel by contacting the gel with a current of heated air, cooling the resulting gaseous mixture to condense out substantially acid-free solvent, recycling the off-gas from said cooling operation and reusing the gel in the above described process.

8. A process for recovering trichlorethylene from a mixture of its vapor with air comprising contacting said mixture at about 10–40° C. with dehydrated alumina gel, removing trichlorethylene from said gel by contacting it with a current of air at 90–150° C., cooling the resulting gaseous mixture to condense trichlorethylene, removing acids from the off-gas from the cooling operation, recycling said off-gas and reusing the gel as above described.

9. A process comprising evaporating trichlorethylene from materials saturated therewith by means of a current of heated air, cooling the resulting mixture of air and trichlorethylene vapor, separating condensed trichlorethylene, contacting the cool uncondensed portion of said mixture with dehydrated alumina gel, thereafter contacting said gel with a current of air heated to about 90–150° C. to substantially completely remove trichlorethylene from said gel, condensing trichlorethylene, purging acids from the non-condensed gases, heating and mixing such gases with further quantities of air for use in the removal of trichlorethylene from further lots of materials saturated therewith.

10. A process comprising evaporating trichlorethylene from textile materials by means of a current of heated air, cooling the resulting mixture of air and trichlorethylene vapor, separating condensed trichlorethylene, contacting the uncondensed portion of said mixture with dehydrated alumina gel until said gel becomes substantially saturated with trichlorethylene, contacting the saturated gel with a current of air heated to about 90–150° C. to substantially completely remove trichlorethylene from said gel, cooling the resulting mixture of air and trichlorethylene vapor, separating trichlorethylene and recycling the gas mixture through the same dehydrated alumina gel for the removal of further quantities of trichlorethylene.

Signed at Niagara Falls, in the county of Niagara and State of New York this 9th day of April A. D. 1931.

PAUL JOHNSON CARLISLE.
RALEIGH P. WARD.